Feb. 5, 1946. G. A. TOMIK 2,394,119
STEERING AND DRIVING GEAR FOR VEHICLES
Filed June 5, 1943 2 Sheets-Sheet 2
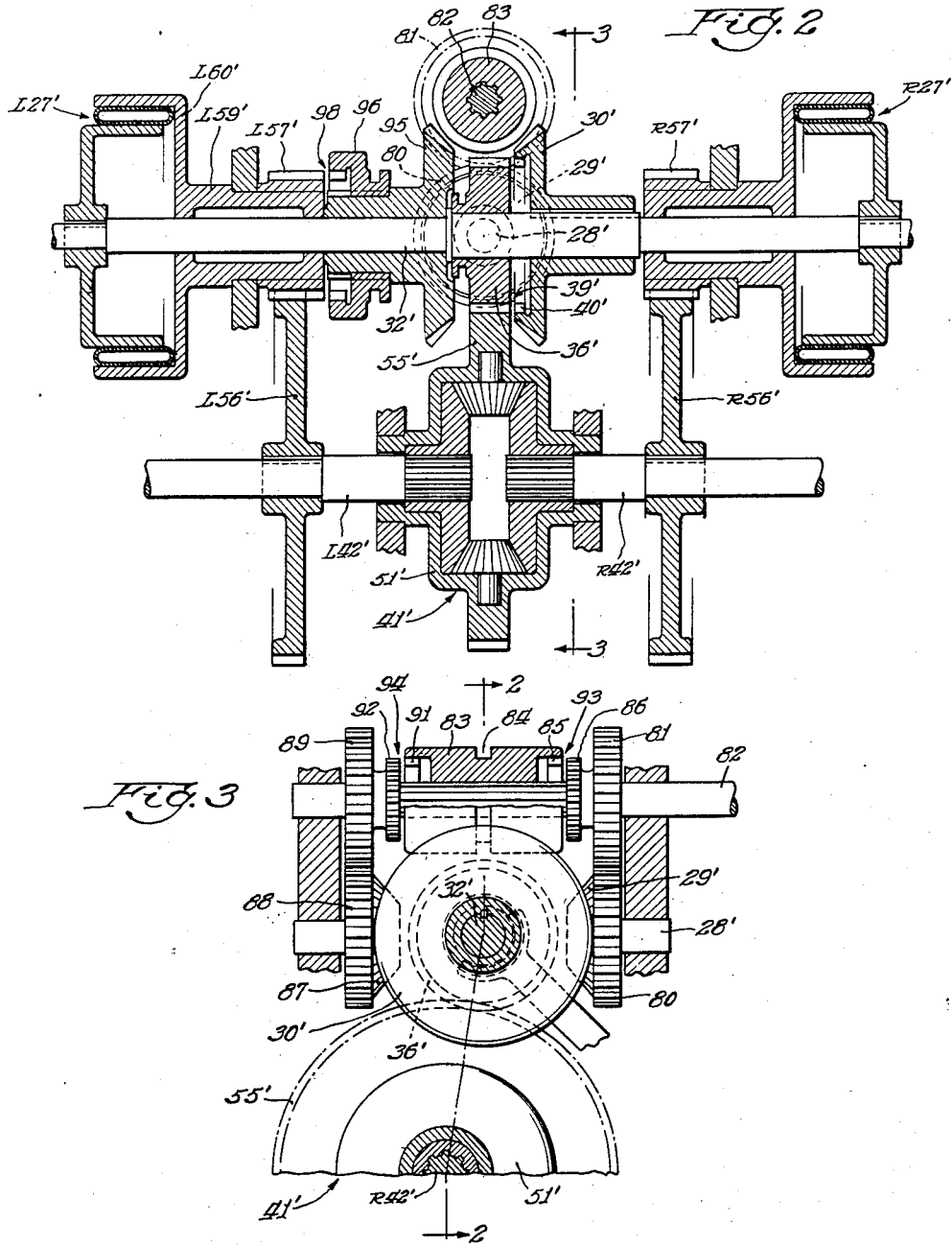
Inventor:
George A. Tomik
By: Paul O. Pippel
Atty.

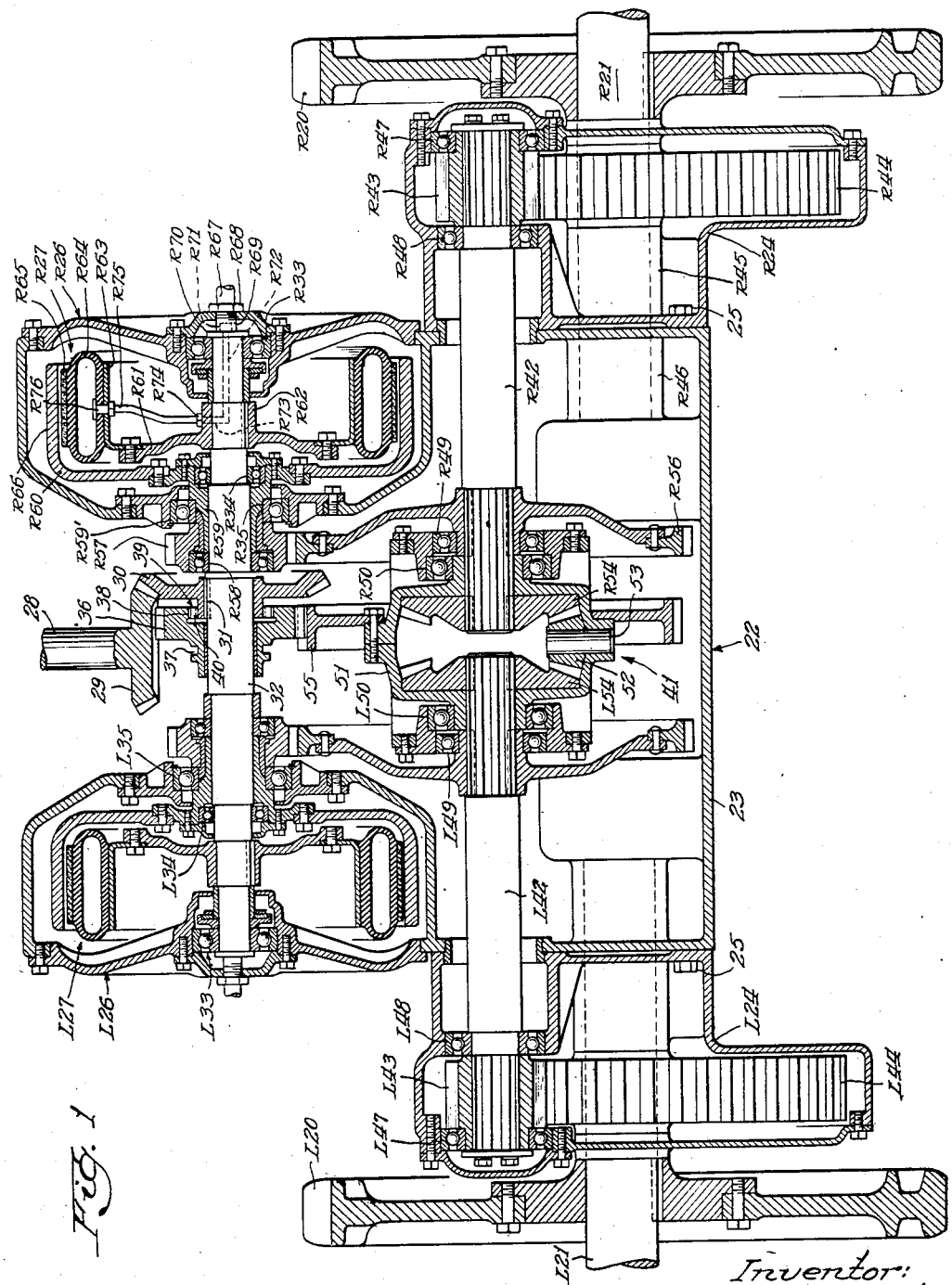

Patented Feb. 5, 1946

2,394,119

UNITED STATES PATENT OFFICE 2,394,119

STEERING AND DRIVING GEAR FOR VEHICLES

George A. Tomik, Orland Park, Ill., assignor to International Harvester Company, a corporation of New Jersey Application June 5, 1943, Serial No. 489,842

17 Claims. (Cl. 180—9.2)

This invention has to do with combined steering and driving gear for vehicles and with an arrangement particularly useful for the drive and manipulation of the propelling units at opposite sides of dirigible track-laying vehicles, although not limited to this exemplicative utilization.

A general object of the invention is the provision of a novel steering and driving gear in which there are a plurality of power transmitting trains connectable in various arrangements to determine the relative speeds and directions of drive of complemental propelling or traction units upon opposite sides of a vehicle for obtaining selective turning rates and directions.

Another general object is the provision of an improved change-speed drive for complemental propelling units that is susceptible to the use of clutches in changing the relative speed of the steering and propelling units, wherefore all of the power received from the vehicle engine is utilized for turning and for driving the vehicle in contradistinction to the practice of steering by braking with its concomitant loss of power through heat generation.

A further general object is the provision, in apparatus of the present kind, of a new arrangement of parallel shafting for simplifying the driving connections between companion power transmitting elements upon such shafting and the releasable clutching of certain elements for rotation with coaxially rotatable members.

These and numerous specific objects encompassed by and inherent to the invention will be better understood from the ensuing description and claims together with the annexed drawings, wherein:

Figure 1 is a sectional view taken transversely of a track-laying vehicle and longitudinally through steering and driving gear therein illustrated;

Figure 2 is a view taken similarly to Figure 1, showing a modified form of the invention; and Figure 3 is a sectional view taken axially through a jaw clutch and driving gear arrangement employed within the apparatus shown in Figure 2, taken upon line 3—3 of Figure 2.

Description of the embodiment of Fig. 1

Referring now to Fig. 1, the form of the invention there shown is for driving the tracks at opposite sides of a tractor of the track-laying type. A sprocket L20 is for driving the track at one side of the vehicle, and a sprocket R20 is for driving the track at the opposite side of the vehicle. These driving sprockets L20 and R20 are keyed or otherwise suitably rotatively fixed upon coaxial shafts L21 and R21, which extend from opposite ends of a casing 22 which has a central cast section 23 and end cast sections L24 and R24, fabricated to the central section as by cap-bolts 25. The casing 22 also includes a clutch casing portion L26 and a clutch casing portion R26, respectively, for friction clutches L27 and R27 which, as later described, are engageable and releasable for selectively establishing and disestablishing power trains for driving the sprockets L20 and R20 at different relative speeds for controlling the direction in which the propelling units (the tracks, not shown, which are driven by the sprockets L20 and R20) are effective for propelling the vehicle. Power for driving the clutches L27 and R27 is received from the vehicle engine (not shown) through a drive shaft 28 which carries a pinion 29 in constant mesh with a gear 30 keyed at 31 to a clutch shaft 32 having opposite end portions journaled within roller bearing units L33, L34, L35, R33, R34, and R35 interposed between such end sections and the clutch casings L26 and R26.

This clutch shaft 32 slidably and rotatively carries a pinion 36 which has a groove 37 within its hub for receiving a shifter fork (not shown) for sliding the gear axially upon said shaft. When the gear 36 occupies its right-most position illustrated in the drawings, an internal jaw-clutch counterpart 38 thereon of a jaw clutch 39 is meshed with an external jaw-clutch counterpart 40 upon the hub of the gear 30. When the clutch 39 is meshed, the gear 36 is coupled for rotation with the clutch shaft 32 and for driving a differential unit 41, and, through this unit 41, coaxial shafts L42 and R42, pinions L43 and R43, and the gears L44 and R44, which are rotatively fixed upon the aforesaid shafts L21 and R21, and differentially driving the track driving sprockets L20 and R20.

At this time it should be noted that the shaft R21 is journaled at its inner end within bearings R45 and R46 within the casing portions R24 and 23 and that the outer end of the shaft R42 is journaled within roller bearing units R47 and R48, while the inner end of such shaft is journaled within the casing by means of ball bearing units R49. Corresponding journal supports for the shafts L21 and L42 are provided in the left-hand side of the casing where such supports are indicated by the same respective reference characters preceded by the letter L. Ball bearing units L50 and R50, adjacent to the units L49 and R49, rotatively support within the casing a carrier 51 or casing of the differential unit 41, within which there are planet pinions 52 of the conventional type journaled upon radially directed shafts 53 anchored within the carrier 51. These pinions 52 mutually mesh with bevel gears L54 and R54, which are respectively splined to the inner ends of the driven members or shafts L42 and R42. The differential carrier 51 includes the gear 55, and this gear is in constant mesh with the axially slidable gear 36 upon the clutch shaft 32.

Differential drive is transmittable from the drive shaft 28 to the driven members L42 and R42 and thence to the track-driving sprockets L20 and R20 by means of the power train consisting of the meshed bevel gears 29 and 30, the clutch 39, the meshed companion gears 36 and 55, and the differential unit 41, for normally driving the sprockets L20 and R20 at the same speed, to cause the vehicle to proceed in a straight course. This condition will prevail so long as neither of the friction clutches L27 and R27 is engaged. These clutches L27 and R27 are primarily steering clutches and accomplish their steering function by establishing respective associated power trains between the drive shaft 28 and the driven shafts or members L42 and R42 for causing rotation of said driven members L42 and R42 and hence the track-driving sprockets L20 and R20 at different relative speeds.

The power train associated with the clutch R27 includes a gear R56 having its hub splined to the driven member R42 and a constantly meshed companion gear R57 journaled upon the clutch shaft 32 by means of a ball bearing unit R58 and fixed for rotation with a hub R59 of a driven counterpart R60 of the clutch R27. Said hub R59 is journaled in the clutch casing R26 upon a ball bearing unit R59'. It should be noted that the gear R56 has a greater radius than the gear 55 upon the differential gear carrier and that the gear or pinion R57 is of smaller radius than the pinion 36 which meshes with the gear 55. This difference in speed-transmitting ratio of the gear trains R56—R57 and 55—36 is for causing the shaft R42 to be driven at a different speed from that of the planet gear carrier 51 when these two gear trains are concurrently connected for receiving power from the drive shaft 28 and to thereby cause the shafts R42 and L42 to rotate at different speeds and the vehicle to be driven upon an arc of predetermined curvature.

The clutch R27, which is closable to establish the gear train R56—R57 in driving relation between the drive shaft 28 and the driven member or shaft R42, includes a driving member R61 having a hub R62 non-rotatively connected to the clutch shaft 32. A flange R63 upon the clutch driving member R61 has fixed thereto an annular inflatable envelope R64, and this envelope has a plurality of friction members R65 distributed circumferentially thereabout and which frictionally engage the inner periphery of a flanged portion R66 of the driven member R60 upon inflation and radial expansion of the envelope R64. Inflating fluid, such as compressed air, is supplied to and discharged from the envelope R64 under the control of a manually operated valve mechanism (not shown). Upon the opening of such valve, pressure fluid is adapted to enter the envelope R64 through a conduit R67, a coupling member R68 anchored within a portion of the clutch casing R26 by means of screw threads R69, a companion coupling member R70 fixed to the right end of the clutch shaft for rotation therewith and having a hollow section projecting coaxially with and from the end of said shaft for rotation in sealed relation within a recess R71 within the threaded part R69 of the coupling member R68. Communication with the conduit R67 continues through a bore R72 in the shaft 32. A lateral bore R73 into a coupling member R74 extends through an opening in the hub R62 of the clutch drive member R61. A hose R75 completes the communication to the envelope R64 through a coupling member R76 which pierces the driving member flange R63 and the inner wall of the envelope.

The clutch L27 is constructed similarly to the clutch R27 and drives a corresponding gear train, wherefore the parts of said clutch L27 and its associated gear train are designated by the same respective reference characters as the parts within the clutch R27 and its gear train R57—R56, with the exception that the letter L is employed instead of the letter R.

*Operation of the apparatus shown in Fig. 1*

Different operating conditions are caused to prevail by operating the apparatus with the jaw clutch 39 opened or closed. Considering the case first of when the clutch 39 is closed and neither of the clutches L27 or R27 is closed or engaged, power from the drive shaft 28 is transmitted through the beveled gears 29 and 30, clutch 39, gears 36 and 55, the differential unit 41, shafts L42 and R42. pinions L43 and R43, gears L44 and R44, shafts L21 and R21, and the sprockets L20 and R20 to the vehicle tracks. When the resistance to movement of said tracks is equal, there will be no differential action of the differential unit 41, wherefore the beveled gears L54 and R54 will be rotated at the same speed to cause advancement of the vehicle tracks at the same speed and movement of the vehicle along a straight course.

While operating with the differential unit 41 driven from the shaft 28 through the aforesaid power train, should it be desired to change the course of the vehicle in one direction—say that incurred by the closing of the clutch R27—that clutch will be closed by causing the introduction of pressure fluid into the envelope R64, whereupon power will be transmitted from the drive shaft 28 through an auxiliary power train including the shaft 32, the clutch drive member R61, the clutch driven member R60 and its hub R59, and the gears R57 and R56 to the driven shaft R42 for causing this shaft to be driven at a slower speed than the carrier 51 of the differential unit 41. This difference in the speeds of the shaft R42 and the gear carrier 51 is incurred because of the difference in the speed-transmitting ratio of the gear trains R57—R56 and 36—55, and the gears R57 and 36 being rotated at the same speed. With the shaft R42 and the differential gear R54 rotatively fixed thereto being thus driven at a slower speed than the gear carrier 51, the planet gears 52 will be caused to rotate about their individually associated shafts 53 to cause the shaft L42 to be driven at a still greater speed with respect to the shaft R42. Hence, the track driven by the sprocket L20 will be advanced faster than that driven by the sprocket R20, causing the vehicle to turn by following along an arc of predetermined curvature.

Should it be desired to cause the vehicle to turn in the opposite direction along an arc of like curvature, the clutch R27 will be disengaged and the clutch L27 engaged. This manipulation will establish the gear train L57—L56 between the drive shaft 28 and the driven shaft or member L42, causing this member to be driven at an under speed with respect to the rate at which the gear carrier 51 is rotated, and the shaft R42 to be driven at an over speed with respect to such speed of the member 51. It follows that the track driven by the sprocket L20 will then be driven at a definite lesser speed than the track driven by sprocket R20, to cause turning of the vehicle in the opposite direction upon an arc of predetermined curvature. Turning in either direction is, therefore, instantly possible simply by selecting engagement of the clutches L27 and R27, and the arrangement is such that the reactive forces incurred in the differential unit 41 for causing one of the shafts L42 or R42 to be driven faster than the other do not involve braking upon any fixed part of the vehicle with the attendant wastage of power, but, on the contrary, the forces incurred within the differential unit react back to the driving member 28, wherefore all of the power supplied to the differential unit is utilized for driving and/or turning the vehicle.

When the jaw clutch 39 is disengaged, no driving force will be transmitted to the track-driving sprockets L20 and R20 when both of the clutches L27 and R27 are also disengaged. However, the clutches L27 and R27 may be concurrently engaged for causing the track-driving sprockets to be driven at the same speed for advancing the vehicle in a straight line similarly to the driving connection solely through the jaw clutch 39. Such driving through the concurrent engagement of the clutches L27 and R27 differs from that incurred solely by the closing of jaw clutch 39 in that the drive to each of the driven shafts L42 and R42, and hence to the sprockets L20 and R20, is a positive drive; that is, no differential action is present in the drive, so that the vehicle will be caused to follow a straight course even though terrain should be encountered in which one of the tracks offers greater resistance to advancement than the other. Another difference incurred by driving the track-driving sprockets L20 and R20 through the power trains respectively concurrently established by the closing of the clutches L27 and R27 is that the sprockets L20 and R20 will be driven at a slower speed, because the gears L57 and R57 are smaller in diameter than the gear 36. Thus greater torque multiplication is obtained when the sprockets L20 and R20 are driven through the clutches L27 and R27 instead of through the jaw clutch 39.

*Description of the embodiment of Figs. 2 and 3*

For the most part the elements within the second embodiment of this invention correspond respectively to those of the first embodiment, and, to expedite this description, those corresponding parts are simply designated by the same reference characters with the addition of a prime. The shaft 28', corresponding to the drive shaft 28 in the first embodiment though not the primary drive shaft in this embodiment, has keyed thereto a gear 80, which is in constant mesh with a gear 81 upon a drive shaft 82 (which is the primary drive shaft in this embodiment) and clutchable for rotation with drive shaft 82 by an axially shiftable clutch member 83 (Fig. 3), which is splined to the shaft 82 and which has a circumferential groove 84 for a shifter fork (not shown). Internal teeth 85 at one end of the shiftable clutch member 83 are meshable with teeth 86 upon the gear 81 for establishing connection of said gear with the shaft 82.

A gear train for driving the bevel gear 30' in the opposite direction to which it is adapted to be driven by the gear 29' includes a bevel gear 87 disposed diametrically opposite to said gear 29' in its constant mesh relation with the bevel gear 30', a spur gear 88 fixed to and rotatable coaxially with the gear 87, and a gear 89 (Figs. 2 and 3) constantly meshed with the gear 88 and freely rotatable upon the shaft 82 but clutchable thereto by the clutch member 83 when the latter is shifted for engaging teeth 91 thereon into mesh with teeth 92 upon the gear 89. The clutch formed by the teeth components 85 and 86 is designated 93, whereas the clutch formed by the components 91 and 92 is designated 94.

A bevel gear 95 is disposed coaxially with and opposite to the gear 30' in mutual mesh with the bevel pinions 87 and 29'. This gear 95 is freely rotatable upon the clutch shaft 32'. A shiftable clutch counterpart 96 is splined to the hub of the gear 95 to engage with end portions of the teeth of gear L57' carried by the hub L59' of the clutch-driven member L60'. The jaw clutch comprising the counterparts 96 and L57' is designated 98.

*Operation of the form shown in Figs. 2 and 3*

One operating condition prevails when the jaw clutch 39' (which includes the jaw clutch counterpart 40' meshable with end portions of the teeth upon the gear 36') is engaged by shifting the gear 36' to the right and, when the clutch-engaging member 83 (Fig. 3) is shifted, say to the right as viewed in that figure, for engaging the clutch 93 and when neither of the friction clutches L27' or R27' is engaged. With these connections, the drive will be from the shaft 82 through the companion gears 81 and 80, clutch 39', gear 36', gear 55', and the differential unit 41' through the driven members L42' and R42', and ultimately to the vehicle tracks. Normally the tracks will be driven at the same speed by this connection for causing the vehicle to follow a straight course. Turning to left or right is effected by closing the clutches L27' and R27' selectively. When the clutch R27' is closed concurrently with the operation of the just-described differentially driving power train, the gear train comprising the gears R57' and R56' will be interposed between the drive shaft and the driven member R42' for causing this member to rotate at slower speed than the differential gear carrier and thus causing the driven shaft L42' to rotate at an over speed with respect to said carrier. Hence, the track driven from the shaft L42' will advance more rapidly than that driven from the shaft R42' for causing the vehicle to turn. When the clutch L27' is engaged instead of clutch R27', the gear train comprising the gears L57' and L56' will be interposed in driving relation between the drive shaft and the driven shaft L42' to cause this shaft to rotate more slowly than the differential gear carrier, and the shaft R42' to rotate at an over speed with respect to said gear carrier, whereby the tracks are driven at such relative speeds as to cause the vehicle to turn upon an arc in the opposite direction.

Under the above driving conditions, should the clutch-engaging member 83 (Fig. 3) be shifted for engaging the clutch 94 instead of the clutch 93, the vehicle would be caused to move in the opposite direction, although the clutches L27' and R27' would be operable for causing the oppositely moving vehicle to turn to the left or to the right upon arcs of the same curvature as before.

Should the clutch 98 be engaged while the clutch 39' is engaged and while the clutches L27' and R27' are disengaged, the driven shaft L42', then driven from the bevel gear 95 through said clutch 98 and the gear train L57' and L56', will be rotated in the opposite direction to the differential planet carrier 51', causing the driven shaft R42' to be rotated at a greater over speed with respect to said carrier 51' than when the shaft L42' is driven by the power train established through the clutch L27' in the same direction as said carrier but more slowly. Therefore, when the clutch 98 is engaged as aforesaid to drive the driven shaft L42' reversely with respect to the direction in which the driven shaft R42' is driven, the tracks of the vehicle will be rotated respectively forwardly and backwardly at different speeds to cause the vehicle to turn upon an arc of very short radius. Shifting of the clutch-engaging member 83 for engaging the other of the clutches 93 or 94 will reverse the relative rotation of the driven shafts L42' and R42', although the shaft R42' will again rotate the more rapidly, causing the vehicle to move in the opposite direction upon the aforesaid short arc.

Other characters of drive and turning of the vehicle are possible when the jaw clutch 39' is disengaged for demobilizing the differential unit 41'. Assuming one of the clutches 93 and 94 to be engaged and the jaw clutches 98 and 39' to be disengaged, turning of the vehicle upon a short radius arc is possible by engaging either of the clutches L27' or R27'. Closing of the clutch L27' will cause the driven shaft L42' to be driven to advance the track upon one side of the vehicle while no power is transmitted to the driven shaft R42', whereby the track at the other side of the vehicle is idle. Similarly, the closing of the clutch R27' while clutch L27' is disengaged will cause the driven shaft R42' to be rotated for advancing the track on the other side of the vehicle while the track on the one side is idle, turning the vehicle upon a short radius arc in the other direction. Under the just-described operating conditions, the vehicle can be caused to move along a straight course by concurrent engagement of the clutches L27' and R27'. Also, under the just-described conditions, the direction of movement of the vehicle upon said short arcs can be reversed by shifting the clutch-controlling member 83 (Fig. 3) to engage the other clutches 93 or 94.

Assuming that the driven shaft L42' is connected for driving the track on the left side of the vehicle in a direction for moving the left side of the vehicle forwardly when the inflatable friction clutch L27' and the jaw clutch 93 are engaged, this advancement of the left side of the vehicle will be upon a very short radius when the other clutches of the apparatus are disengaged, since the shaft R42' will then not be driven, and the track on the right side of the vehicle will be idle. Under these driving conditions, it is possible to reverse the direction of traversal of this arc by the vehicle by simply disengaging the clutch L27' and engaging the jaw clutch 98. The same effect of reversing the direction of traversal upon the aforesaid short arc can be obtained by leaving the clutch L27' engaged and shifting the clutch control member 83 for disengaging the jaw clutch 93 and engaging the clutch 94.

The vehicle can be caused to execute substantially a pivotal movement about a vertical axis therein when one of the clutches 93 or 94 is engaged together with the clutches 98 and R27' while the other clutches are disengaged. This connection, since the driven shaft L42' will be driven from the gear 95, which rotates in the reverse direction of the gear 30', will cause the track driven from the shaft L42' to move oppositely to the track driven from the shaft R42', and, since the two tracks will be driven at essentially the same speed in opposite directions, the vehicle will be caused to pivot without incurring any substantial bodily translation. The direction of this pivotal movement can be reversed by shifting the clutch control member 83 (Fig. 3) for selectively engaging the jaw clutches 93 and 94.

While I have herein shown and described but two preferred embodiments with the view of illustrating the invention, it should be understood that the invention extends to other forms, arrangements, structures, and details falling within the scope and spirit thereof and not sacrificing all of its material advantages.

What is claimed is:

1. In a drive assembly for complemental steering and propelling units of a dirigible vehicle; the combination of driven members rotatable for respectively driving said steering and propelling units, a rotatable drive member, a disruptable differential power train including counterparts respectively connected with said driven members for differentially driving said driven members from the drive member, auxiliary power trains establishable in driving relation between the drive member and respective of the driven members independently of said differential counterparts and of a speed transmitting ratio for driving said driven members at a speed differing from that at which they are normally driven solely by the differential power train, means for disrupting the differential power train, and means for selectively establishing said auxiliary power trains singly and concurrently in their said driving relation.

2. In a drive assembly for complemental propelling and steering units of a dirigible vehicle; the combination of driven members rotatable for respectively driving said units, a rotatable drive member, a clutch shaft driven from said drive member, means connectable between said clutch shaft and both of said driven members for differentially driving said driven members from said clutch shaft at a normal predetermined speed relatively to the clutch shaft, auxiliary power trains respectively connectable between said driven members and the clutch shaft for driving such members at a different predetermined speed in the same direction, and clutches respectively associated with the differentially driving means and said auxiliary power trains to selectively establish said connections thereof.

3. In a drive assembly for complemental propelling and steering units of a dirigible vehicle; the combination of driven members rotatable for respectively driving said units, a rotatable drive member, means connectable between said drive member and both of said driven members for differentially driving said driven members from said drive member at a predetermined normal speed relatively to said member, auxiliary power trains connectable between said drive member and respective of the driven members to drive the latter at a different speed, and clutch means for selectively establishing the driving connection of said differentially driving means and either or both driving connections of said auxiliary power trains.

4. In a drive assembly for driving complemental propelling and steering units of a dirigible vehicle from a rotating drive member: the combination of coaxially rotatable driven shafts having juxtaposed inner ends; a differential unit comprising ring-gears rotatably fixed upon said ends of the driven members, planetary pinions meshed with and between said ring-gears, and a carrier for said pinion; disruptable driving means for driving said carrier and hence the driven shafts at a predetermined speed from and relatively to the drive member; a counter-shaft disposed in parallelism with the driven shafts and driven rotatively from said drive member; a first set of companion drive members respectively upon one of the driven shafts and the counter-shaft and of which one is clutchable to its shaft to cause rotation of the associated driven shaft at a speed different from said predetermined speed; a second set of companion drive members respectively upon the other of the driven shafts and the counter-shaft and of which one is clutchable to its shaft to cause rotation of the associated driven shaft at a speed different from said predetermined speed; means for retrievably disrupting the disruptable driving means; and means for concurrently or singly selectively clutching the clutchable companion drive members to their shafts.

5. In a drive assembly for complemental propelling and steering units of a dirigible vehicle: the combination of coaxially rotatable driven shafts having juxtaposed inner ends; a differential unit comprising ring-gears rotatively fixed upon said ends of the driven members, planetary pinions meshed with and between said ring-gears, and a carrier for said pinions; a clutch shaft rotatively driven from the drive member and arranged in parallelism with the driven shafts; a first set of companion drive members respectively rotatively fixed with the differential pinion carrier and upon and clutchable to said clutch shaft for driving said carrier and hence the driven shafts normally at the same speed; a second set of companion drive members respectively rotatively fixed upon one of the driven shafts and rotatable upon but clutchable to the clutch shaft, said second set having a speed transmission ratio to effect driving of the one driven shaft at a speed different from said same speed when the rotatable companion member is clutched for rotation with the clutch shaft; a third set of companion drive members respectively rotatively fixed upon the other driven shaft and rotatable upon but clutchable to the clutch shaft, said third set also having a speed transmission ratio to effect driving of its associated driven shaft at a speed different from said same speed when the rotatable companion member thereof is clutched to the clutch shaft; and means for selectively clutching the clutchable companion members to the clutch shaft to obtain conditions in which said establishable members are clutched singly, or in which the second and third of said clutchable members are clutched concurrently or in which the first of said clutchable members is clutched concurrently with one of the second and third members.

6. In a drive assembly for steering and propelling units of a dirigible vehicle; the combination of driven members independently rotatable for respectively driving said units, a differential drive unit including a drivable drive part and driven parts differentially drivable therefrom and respectively drive-connected with said driven members, a drive member, a power train connectable between said drive member and said drive part for normally driving the differential unit and hence the driven members at one speed relative to the drive member, and auxiliary power trains selectively connectable singly or concurrently between the drive member and respective of the driven members, said auxiliary power trains being of the same speed ratio but differing from that of the first power train wherefore they are operable while connected, and while the first train is disconnected, to drive the driven members at the same speed in the same direction to cause the vehicle to follow a straight course at a different speed relative to the drive member from that if the first power train were connected, and wherefore the driven members are drivable at different speeds to cause turning of the vehicle when either auxiliary train is connected concurrently with the connection of the first power train.

7. In a drive assembly for steering and propelling units of a dirigible vehicle; the combination of driven members disposed in end-to-end relation for coaxial rotation to respectively drive said units, a differential drive unit rotatable bodily coaxially with said driven members and including a drivable drive part and driven parts differentially drivable therefrom and respectively drive-connected with said driven members, a shaft in spaced parallelism with the driven members, a power train connectable between said shaft and the drive part of the differential unit for normally driving such unit and hence the driven members at one speed ratio relative to the drive member, auxiliary power trains selectively connectable between said shaft and respective of the driven members, said auxiliary power trains being of the same speed-transmitting ratio but differing from that of the first power train, and means for selectively controlling the connections of said power trains to provide for an operating condition in which the first power train is solely connected to drive the driven members at one speed, an operating condition in which the auxiliary power trains are concurrently connected exclusively of the first power train to drive the driven members at identical speeds differing from the one speed, and operating conditions in which either auxiliary train is connected concurrently with the first train to selectively drive either of the driven members at a greater speed than the other.

8. In a drive assembly for steering and propelling units of a dirigible vehicle; the combination of driven members independently rotatable for respectively driving said units, a differential unit including a drivable drive part and driven parts differentially drivable therefrom and respectively drive-connected with said driven members, a power train establishable in driving relation with said differential drive part for rotating the same for normally driving the driven parts thereof and said driven members at the same speed to cause propulsion of the vehicle along a straight course, an auxiliary power train establishable in driving relation with one of the driven members to rotate the same in the same direction it would be driven by the first power train but at different speed to thereby cause the vehicle to turn in one direction upon an arc of predetermined curvature, a forward drive clutch through which all of said trains are drivable, a reverse drive clutch through which all of said trains are drivable, and means for selectively engaging said clutches to determine the direction of vehicle movement upon said arc.

9. In a drive assembly for steering and propelling units of a dirigible vehicle; the combination of driven members independently rotatable for respectively driving said units, a differential unit including a drivable drive part and driven parts differentially drivable therefrom and respectively drive-connected with said driven members, a power train establishable in driving relation with said differential drive part for rotating the same for normally driving the driven parts thereof and said driven members at the same speed to cause propulsion of the vehicle along a straight course, auxiliary power trains establishable in respective driving relation with said driven members for driving the same in respective directions for causing opposite movement of the steering and propelling units with the effect of executing a substantially pivotal turn of the vehicle, means for selectively establishing the first power train singly, or concurrently establishing the auxiliary power trains without incurring establishment of the first power train, or singly establishing either auxiliary power train without incurring establishment of the first power train.

10. The combination set forth in claim 9, and wherein there is also means for reversing the directions the driven members are driven by said auxiliary power trains, to cause the pivotal turn to be executed in the opposite direction.

11. In a drive assembly for steering and propelling units of a dirigible vehicle; the combination of driven members independently rotatable for respectively driving said units, a differential unit including a drivable drive part and driven parts differentially drivable therefrom and respectively drive-connected with said driven members, a power train establishable in driving relation with said differential drive part for rotating the same for normally driving the driven parts thereof and said driven members at the same speed to cause propulsion of the vehicle along a straight course, auxiliary power trains establishable in respective driving relation with said driven members, means for concurrently establishing the auxiliary power trains without establishment of the first train, and the means for establishing the one of said auxiliary trains being selectively connectable to cause said one auxiliary train to rotate its associated driven member in the same or opposite direction as the other driven member for causing the vehicle to follow a straight course or to execute a pivotal turn.

12. The combination set forth in claim 11, and wherein there is also means for concurrently reversing the directions the driven members are driven by the auxiliary power trains, to cause the pivotal turn to be executed in the opposite direction.

13. In a drive assembly for steering and propelling units of a dirigible vehicle; the combination of driven members independently rotatable for respectively driving said units, independent positive power trains establishable in respective driving relation with said driven members, means for concurrently establishing said power trains for causing rotation of the driven members in the direction to cause movement of the vehicle along a straight course, and means for alternately so concurrently establishing one of said trains for rotating its associated driven member oppositely to that occurring in the aforesaid concurrent establishment, to cause opposite movement of the propelling units with the effect of pivotally turning the vehicle.

14. The combination set forth in claim 13, and wherein there is also means for reversing the directions in which said power trains are effective for driving said driven members, to cause execution of the pivotal turn in the opposite direction.

15. The combination set forth in claim 5, wherein the means for selectively clutching the clutchable companion members to the clutch shaft is operable to clutch said clutchable members singly or in any combination of pairs thereof.

16. In a drive assembly for steering and propelling units of a dirigible vehicle; the combination of coaxial driven members independently rotatable for respectively driving said units, a differential unit including a drivable drive part and driven parts differentially drivable therefrom and respectively drive-connected with said driven members, a rotatable shaft disposed in spaced parallelism with the axis of said driven members, axially opposed beveled gears disposed coaxially about said shaft, beveled pinions each mutually meshed with said beveled gears, one pinion being drivable to cause concurrent rotation of the beveled gears in opposite directions and the other pinion also being drivable to cause concurrent rotation of the beveled gears in opposite directions but respectively reversely to the directions driven by the one gear, a first gear train establishing a driving connection between one of the beveled gears and the differential unit drive part, a second gear train for establishing a driving connection between the other beveled gear and one of said shafts for driving the same oppositely to the direction the differential unit drive part is driven by the first gear train, clutch means for selectively transmitting driving force to said beveled pinions, and an auxiliary clutch means for selecting conditions of establishment and disestablishment of the second gear train.

17. In a drive assembly for steering and propelling units of a dirigible vehicle; the combination of coaxial driven members independently rotatable for respectively driving said units, a differential unit including a drivable drive part and driven parts differentially drivable therefrom and respectively drive-connected with said driven members, a rotatable shaft disposed in spaced parallelism with the axis of said driven members, axially opposed beveled gears disposed coaxially about said shaft, beveled pinions each mutually meshed with said beveled gears, one pinion being drivable to cause concurrent rotation of the beveled gears in opposite directions and the other pinion also being drivable to cause concurrent rotation of the beveled gears in opposite directions but respectively reversely to the directions driven by the one gear, a first gear train establishing a driving connection between one of the beveled gears and the differential unit drive part, a second gear train for establishing a driving connection between either of said beveled gears and one of said shafts for driving such shaft in opposite directions depending upon which of the beveled gears is the driver, clutch means for selectively establishing the drive connections of the second gear train with the beveled gears, and additional clutch means for selectively transmitting driving force to the beveled pinions.

GEORGE A. TOMIK.